(12) United States Patent
Koczwara et al.

(10) Patent No.: US 11,067,112 B2
(45) Date of Patent: Jul. 20, 2021

(54) PIN AND CARRIER LOCKING ASSEMBLY

(71) Applicant: Hamilton Sundstrand Corporation, Charlotte, NC (US)

(72) Inventors: Wojciech Koczwara, Lower Silesia (PL); Tomasz Wilk, Wrocław (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 695 days.

(21) Appl. No.: 15/974,792

(22) Filed: May 9, 2018

(65) Prior Publication Data
US 2019/0024695 A1    Jan. 24, 2019

(30) Foreign Application Priority Data
Jul. 18, 2017    (EP) .................................. 17461569

(51) Int. Cl.
*F16B 21/18*    (2006.01)
*F16H 57/08*    (2006.01)
*F16H 57/12*    (2006.01)

(52) U.S. Cl.
CPC ........... *F16B 21/18* (2013.01); *F16H 57/082* (2013.01); *F16H 2057/085* (2013.01); *F16H 2057/126* (2013.01); *F16H 2057/127* (2013.01)

(58) Field of Classification Search
CPC ............ F16H 57/082; F16H 2057/127; F16H 2057/126; F16H 2057/085; F16B 21/18
USPC ......................................... 475/331, 347, 348
See application file for complete search history.

(56) References Cited

U.S. PATENT DOCUMENTS

| 3,943,780 A * | 3/1976 | Klaue ................... F16H 1/2836 |
| | | 475/317 |
| 4,524,643 A | 6/1985 | Ziegler et al. |
| 5,356,352 A | 10/1994 | Sakamoto et al. |
| 6,817,962 B2 | 11/2004 | Tanikawa |
| 7,568,993 B2 * | 8/2009 | Schulz .................. F16H 1/2854 |
| | | 475/336 |
| 9,512,900 B2 | 12/2016 | Hederstad et al. |
| 2017/0227093 A1 * | 8/2017 | Matsumoto .......... F16H 1/2863 |

FOREIGN PATENT DOCUMENTS

GB                820237 A        9/1959

OTHER PUBLICATIONS

European Search Report for Application No. 17461569.0-1012 dated Jan. 23, 2018, 7 pages.

* cited by examiner

*Primary Examiner* — Roger L Pang
(74) *Attorney, Agent, or Firm* — Cantor Colburn LLP (57) ABSTRACT

A pin and carrier locking assembly is described for locking a pin and carrier in position relative to each other. The carrier has first and second opposing arms, each comprising a bore therein and the axial ends of the pin are positioned within these opposing bores of the carrier. The assembly further comprises a hollow bearing provided around and coaxially with said pin and between said first and second arms. The bearing is positioned so as to not contact the first arm of the carrier but to contact the second arm of the carrier and a washer is positioned between the bearing and the first arm of the carrier so that a first section of the washer makes a first contact area with the first arm of the carrier.

15 Claims, 8 Drawing Sheets

PIN AND CARRIER LOCKING ASSEMBLY

FOREIGN PRIORITY

This application claims priority to European Patent Application No. 17461569.0 filed Jul. 18, 2017, the entire contents of which is incorporated herein by reference.

FIELD OF THE INVENTION

This disclosure relates to the field of locking assemblies. The disclosure relates, in particular, to locking assemblies that may be used for locking small diameter pins within a carrier. Such locking assemblies are often found in planetary gear mechanisms or planetary gear boxes, such as those used in Irkuat Slat Actuators, as well as other devices.

BACKGROUND

Mechanical devices are often used as the actuating mechanism in many electro-mechanical linear actuators in variety of industries such as manufacturing and aerospace. Many devices use carriers to hold satellite features of the device in planetary gear mechanisms. For example, Irkut Slat Actuators use carriers to hold satellite gears of a planetary gearbox.

Each satellite gear is usually assembled on the carrier by being positioned concentrically around a shaft that is held in place between two brackets of the carrier. Axial movement of the shaft is blocked via the use of a washer that is positioned on one side of the carrier, with the washer being held in place between features of the carrier, (such as ears and holders). The washer acts to hold all of the planetary gears in place within the carrier at the same time. The present disclosure aims to improve on such known assemblies in terms of ease, speed and cost of manufacturing.

SUMMARY

An improved assembly for locking a pin and carrier in position relative to each other is described herein, the carrier having first and second opposing arms, each comprising a bore therein; and the pin having a longitudinal axis, wherein the axial ends of said pin are positioned within said opposing bores of the carrier; and the assembly further comprising a hollow bearing provided around and coaxially with said pin and between said first and second arms; said bearing being positioned so as to not contact the first arm of the carrier but to contact the second arm of the carrier; and the assembly further comprising: a washer positioned between said bearing and the first arm of the carrier; and wherein said washer is positioned so that a first section of the washer makes a first contact area with the first arm of the carrier, and wherein the washer is bent at a first angle away from said first contact area so as to extend towards and make a second contact area with the bearing.

In some examples described herein, the washer is bent at a second angle away from said second contact area so as to extend back towards and make a third contact area with the first arm of the carrier.

In some examples, at said first contact area, the washer extends in a direction that is perpendicular to the axis of the pin.

In some examples described herein, at said third contact area said washer extends in a direction that is perpendicular to the direction in which the washer extends at the first contact area and/or parallel to the axis of the pin.

In some examples described herein, said third contact area is on an external peripheral portion of the first arm of the carrier and extends in the axial direction. In some examples, the third contact area comprises the outer circumferential surface of the first arm of the carrier.

In any of the examples described herein, said washer may be U, V, or Y shaped.

In any of the examples described herein, a first, or lower, section of the washer that forms the bottom part of the U, V, or Y-shape may contact, at said first contact area an inner surface of the first arm of the carrier. The inner surface of the first arm of the carrier may face the inner surface of the second arm of the carrier.

In any of the examples described herein, said pin may comprise a cylindrical shaft extending along said axis with a first cylindrical outer diameter; and said pin may further comprise first and second gripping sections provided at diametrically opposite sides of said pin, said pin having a second diameter between said gripping sections, said second diameter being smaller than said first diameter; and wherein a width W between first and second arms of said washer is smaller than said first diameter, but corresponds to said second diameter so that the inner surface of the arms of the U, V or Y-shape to contact the gripping sections of said pin.

In some of the examples described herein, the surfaces of the arms that contact the surface of the pin at said gripping section have correspondingly matched shapes or surface contours.

In some of the examples described herein, these corresponding shapes are both flat and/or parallel to each other. In other examples, the surfaces have correspondingly matched angled surfaces.

In some of the examples described herein, these corresponding surfaces of the pin and arms of the washer are both curved.

In any of the examples described herein, the carrier arms may extend radially from the outer circumference of a ring-shaped carrier.

The assemblies described herein may be used in a planetary gear mechanism comprising the pin and carrier locking assembly of any preceding claim, the gear mechanism further comprising a sun gear, a ring gear, positioned coaxial to the sun gear and a plurality of planetary gears positioned around said pins and further positioned externally to the sun gear but internally to the ring gear so that the outer surface of the planetary gears engage with both the external surface of the sun gear and the internal surface of the ring gear.

The assemblies described herein may also be used in any other mechanisms that require a pin to be held by and locked in place in a carrier.

A method for locking a pin and carrier in position relative to each other is also described herein comprising: providing a carrier having first and second opposing arms, each comprising a bore therein; and providing a hollow cylindrical bearing between said arms of the carrier; axially inserting a first end of said pin into the bore provided in the first arm of the carrier, through said hollow center of the bearing and into the bore of the second arm so that said bearing is positioned so as to not contact the first arm of the carrier but to contact the second arm of the carrier; and positioning a washer between said bearing and the first arm of the carrier so that a first section of the washer makes a first contact area with the first arm of the carrier, and wherein said washer is bent at a first angle away from said first contact area so as to extend towards and make a second contact area with the bearing.

The method may also comprise the step of bending the washer at a second angle away from said second contact area so as to extend back towards and make a third contact area with the first arm of the carrier.

In any of the examples described herein the method may further comprise bending said washer at a second angle Y away from said second contact area so that said washer extends back towards and make a third contact area with the first arm of the carrier.

The method may further comprise positioning said washer so that the washer extends in a direction that is perpendicular to the axis P of the pin.

The method may further comprise positioning said washer so that, at said third contact area, said washer extends in a direction that is perpendicular to the direction in which the washer extends at the first contact area.

In any of the methods described herein, the washer may be U, V, or Y shaped.

In any of the methods described herein, said pin may comprises a cylindrical shaft extending along said axis with a first cylindrical outer diameter; and said method may further comprise providing first and second gripping sections at diametrically opposite sides of said pin so that said pin has a second diameter between said gripping sections that is smaller than said first diameter; and positioning said washer relative to said pin so that first and second arms of said washer are in contact with said first and second gripping sections, a width G between said first and second arms of said washer being smaller than said first diameter, but corresponding to said second diameter to allow the inner surface of the arms to contact and grip the gripping sections of said pin.

BRIEF DESCRIPTION OF THE DRAWINGS

Preferred embodiments will now be described by way of example only, with reference to the accompanying drawings in which.

DETAILED DESCRIPTION

Figure 1A:
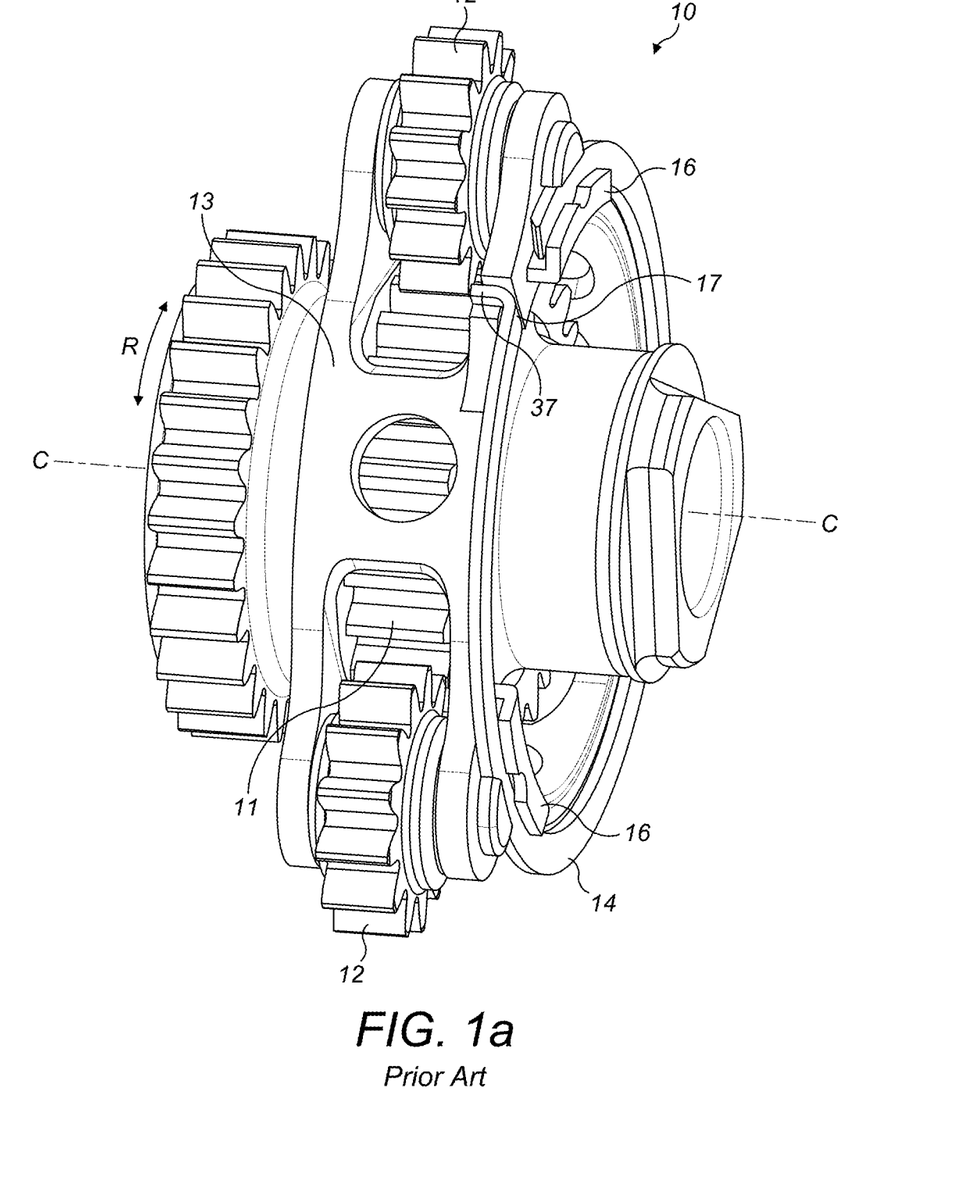
FIG. 1A depicts a perspective view of a known planetary gear mechanism.
Figure 1B:
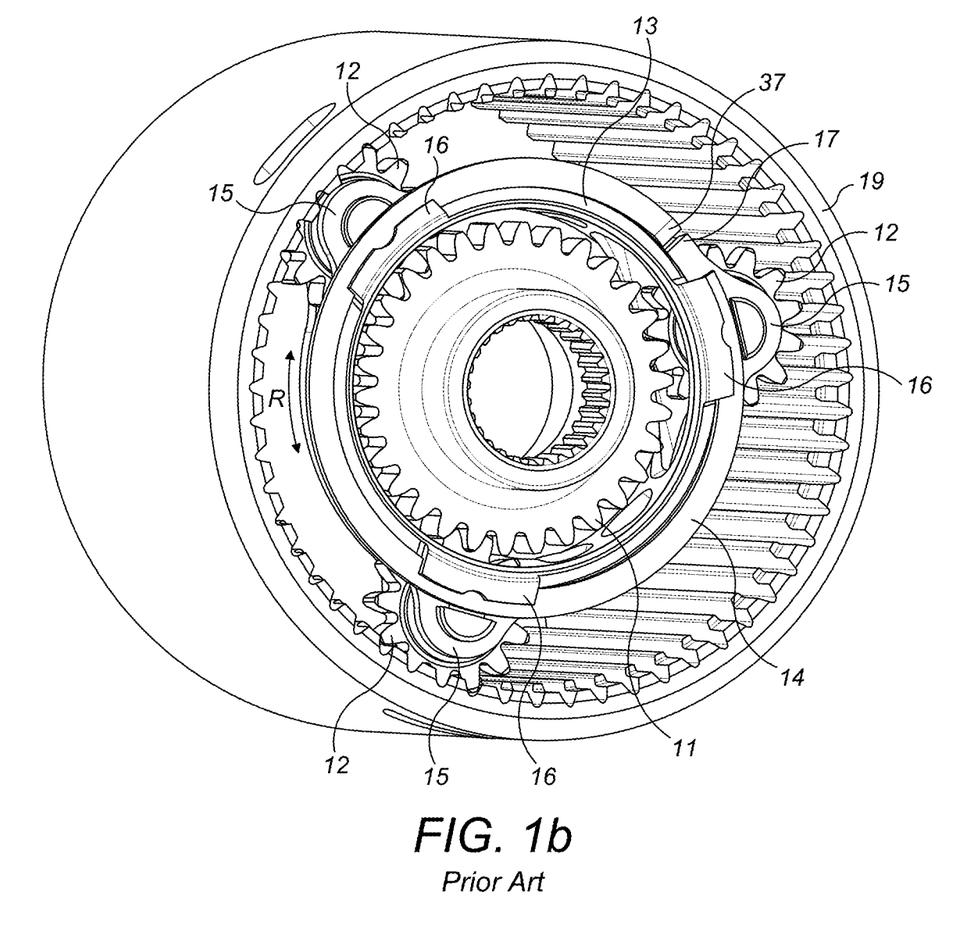
FIG. 1B depicts another perspective view of a known planetary gear mechanism.

A known planetary gear mechanism 10 is shown in FIGS. 1A and 1B. A planetary gear mechanism 10 may comprises a sun gear 11, a ring gear 19 provided coaxial to the sun gear 11 and a plurality of planetary gears 12 positioned externally to the sun gear 11 and internally to the ring gear 19 so that the outer surface of the planetary gears 12 engage with both the external surface of the sun gear 11 and the internal surface of the ring gear 19. Each planetary gear 12 is positioned around a pinion pin (not shown in FIGS. 1A and 1B) which is concentric with and coaxial to the surrounding planetary gear 12. A carrier 13, is also provided, having three pairs of radially extending arms 15 about its outer circumference, each of which has a bore 18 provided therein. The bore of each opposing arm 15 receives an axial end of one of the pinion pins. When the pinion pins are positioned within the bores (not shown) of the carrier 13, the carrier 13 is then therefore able to support the pinion pins and corresponding planetary gears 12 so that the pinion gears 12 may rotate about the sun gear 11 in use, as is known in the art.

For known mechanisms, e.g. such as those used in Irkut Slat Actuators, axial movement of the shaft of the pinion pin in and out of the bores 18 of the carrier 13 may be blocked using a circular washer 14 that is mounted on one side of the external surface of the carrier 13, so as to be concentric with the sun gear 11, as shown in FIGS. 1A and 1B. The washer 14 may be held in place relative to the carrier 13 and planetary gears 12 etc. via the use of fastening features such as holders 16 (see FIGS. 1A and 1B) that are formed protruding axially away from the ears 15 of the carrier body which hold the planetary gears 12. The washer 14 is further locked in place via the use of a slot 17 that is formed to extend axially somewhere around the outer perimeter of the carrier 13, as shown in FIGS. 1A and 1B. This slot 17 in the carrier 13 is positioned, sized and shaped so as to receive a correspondingly sized and shaped protrusion 37 of the carrier 13, as shown in FIG. 1. This type of known washer 14 therefore positions and locks all three pins and planetary gears 12 in place at once.

Although this known solution may provide a safe and sure way to prevent axial movement of the shaft of the pinion pin relative to the carrier 13, this unfortunately results in the generation of high costs of manufacturing. The manufacture of such intricate features of the washer 14 and carrier 13 of this known system (such as the holders, protrusion, slot etc.) is also very complex and time consuming for manufacture and the carrier 13 must also initially be first formed in a particular shape, and material thereafter removed. For example, looking at FIG. 1B it can be seen that the carrier 13 must be manufactured to comprise three circumferential holders 16 for receiving the washer 14 and holding it in place and the process to make these holders 16 involves milling as well as extra lengths of material in which the holders 16 will be created. This therefore also wastes both time and materials during manufacture. In addition to this, the slot 17 for receiving the axially extending protrusion 37 of the washer 14 must also be machined, resulting in additional manufacturing time and expense.

In contrast to this, as will be described below with reference to FIGS. 2 to 7, the improved assemblies described herein require a smaller length of material, since the carrier is only required to radially extend further in the place where the satellite/planetary gears are fixed to the washer.

The improved examples described herein with reference to FIGS. 2 to 7 therefore aim to provide a new type of mechanism for locking a pin having a relatively small diameter, such as a pinion pin in place within a carrier. In some examples, the diameter of the pin may be in the region of between about 2 mm and 12 mm; however, in the examples shown in FIGS. 2 to 7, the diameter is 4 mm. In contrast to known assemblies such as those shown in FIGS. 1A and 1B, the only machining that may be necessary for the pins used in the improved assemblies described with reference to FIGS. 2 to 6, may be to provide a gripping surface on circumferentially opposite sides of the pin. As described below, this gripping surface may be performed by providing two parallel cuts (or indeed other similar gripping shapes) on the pin to prevent pin rotation when fixed with the washer.

Although the improved examples described herein with reference to FIGS. 2 to 7 are shown in relation to a planetary gear mechanism, in theory, this improved locking mechanism could also be used in other situations wherein a relatively small diameter pin is required to be positioned between the brackets of a carrier for a compact construction.

Figure 5:
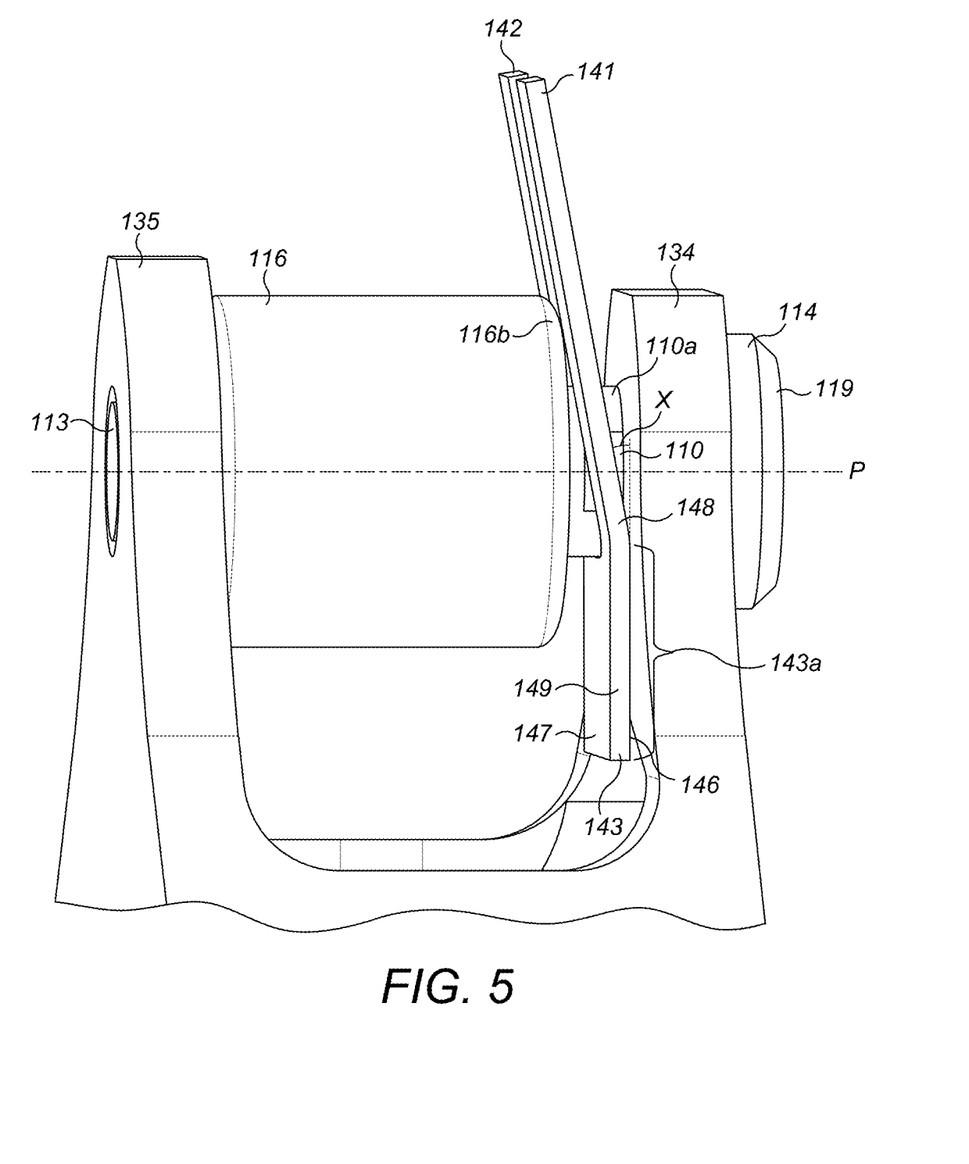
FIG. 5 depicts a side view of a new and improved pin and carrier locking assembly following insertion of a pre-bent washer, but prior to the arms being bent back to contact the carrier.

When the improved assemblies described herein are used in Irkuat Slat Actuators, these assemblies require less space than conventional assemblies. As described below, in some examples of the improved assemblies, the traditional carrier and washer with associated holders, slots and protrusions may be replaced with a pin having a corresponding shape to the surface of the washer which it is in contact with (to grip the pin in place so that it does not move relative to the washer). The washer also may be pressed into place by bending the washer into position to have a side surface that has an L shape as shown in FIG. 5 (one section of which is perpendicular to the axis of the pin) and the other section which supports the arms of the washer.

An improved assembly for locking a pin 110 in position relative to a carrier 130 is therefore now described in detail herein with reference to FIGS. 2 to 7.

Figure 2:
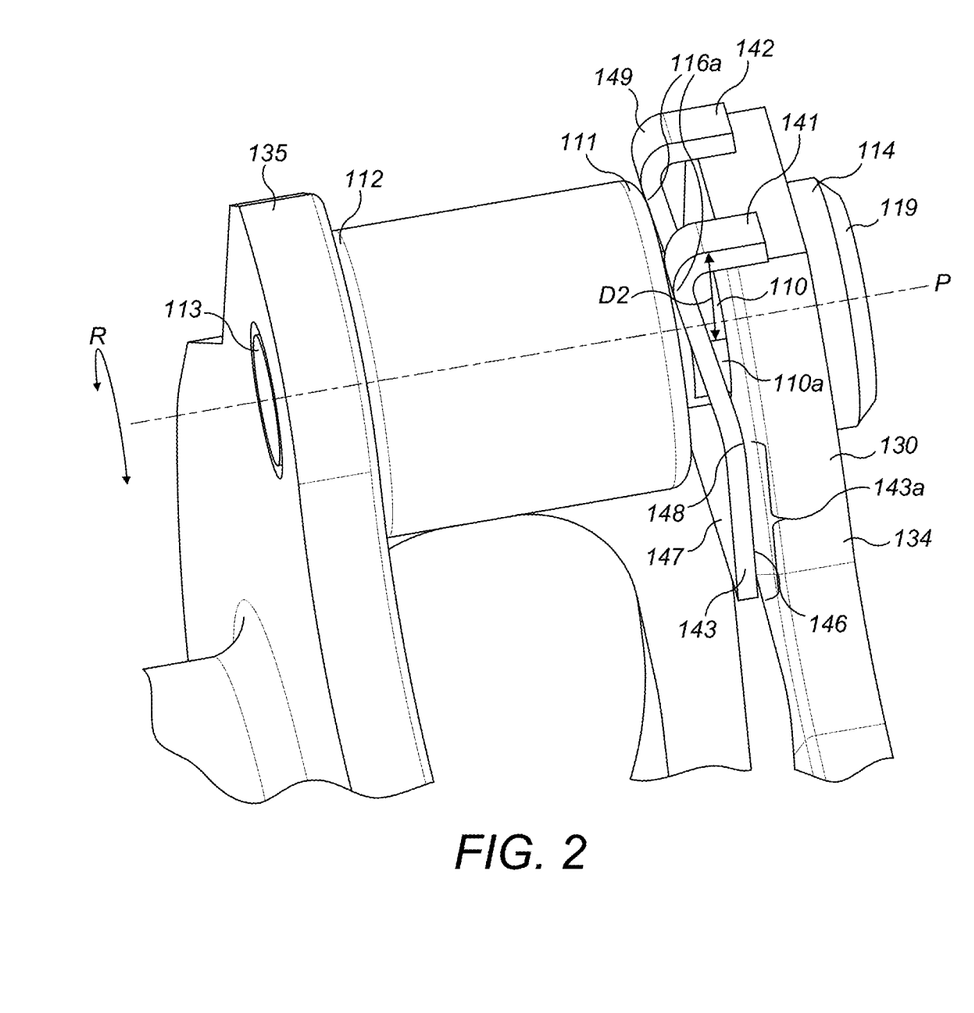
FIG. 2 depicts a perspective view of a new and improved pin and carrier locking assembly.

FIG. 2 depicts a perspective view of an improved locking assembly for a pin 110 relative to a carrier 130. This pin 110 and carrier 130 may be found in a planetary gear mechanism such as that described above (or indeed any other system wherein a pin must be held in place relative to a carrier).

Figure 7:
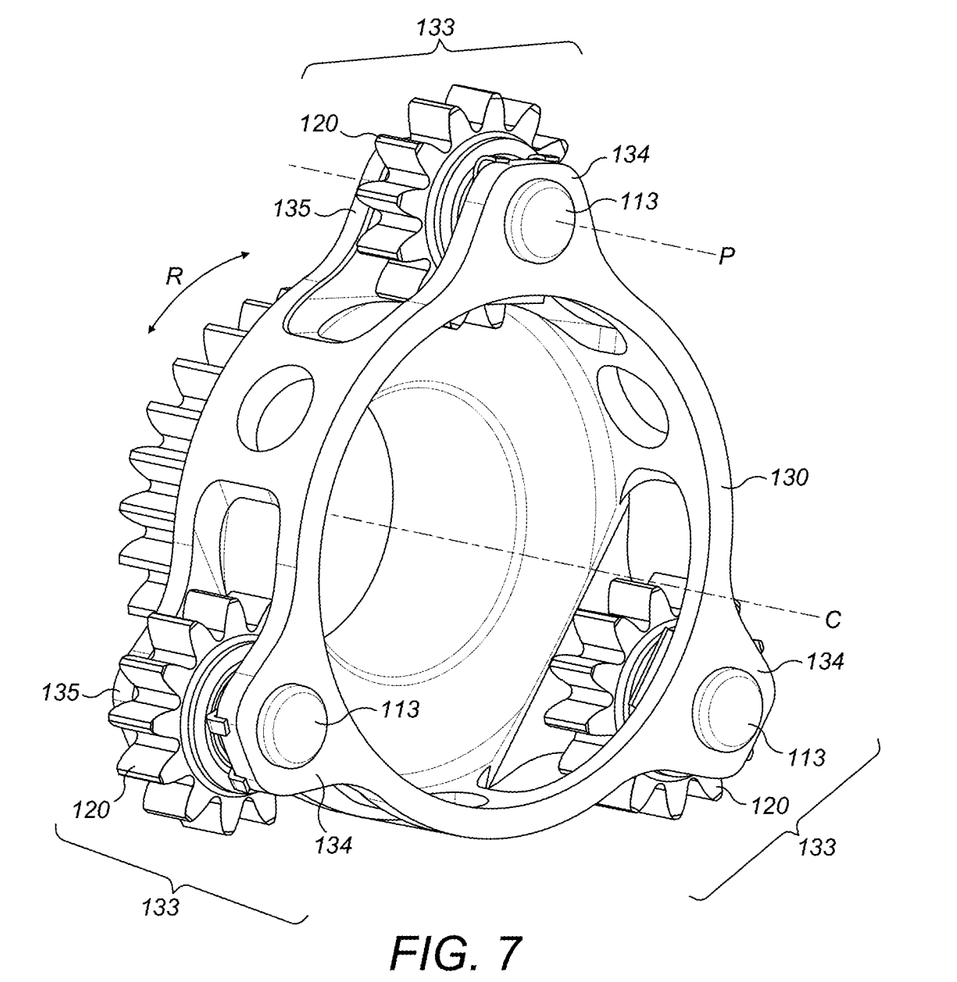
FIG. 7 depicts a perspective view of an improved carrier on which planetary gears are positioned.

The carrier 130 itself is depicted more clearly in FIG. 7 and may be generally ring shaped (so that the sun gear can be positioned internally to the carrier, and coaxially with the carrier 130), with a plurality of (e.g. three) circumferentially spaced planetary gear 120 holder sections 133. Each planetary gear holder section 133 comprises two radially extending and axially facing arms, 134, 135, each of which comprises a bore 180 penetrating axially through the arm 134, 135, for receiving a pin 110 on which the planetary gear is coaxially and concentrically positioned in use. In use, the carrier 130 and associated planetary gears 120 rotate about the central axis C of rotation of the carrier 130, sun gear and ring gear. The axis P of each pin 110 therefore extends perpendicularly to the direction of rotation R of the carrier 130 in use, as it rotates about the central axis, C, as shown in the figures.

Figure 3:
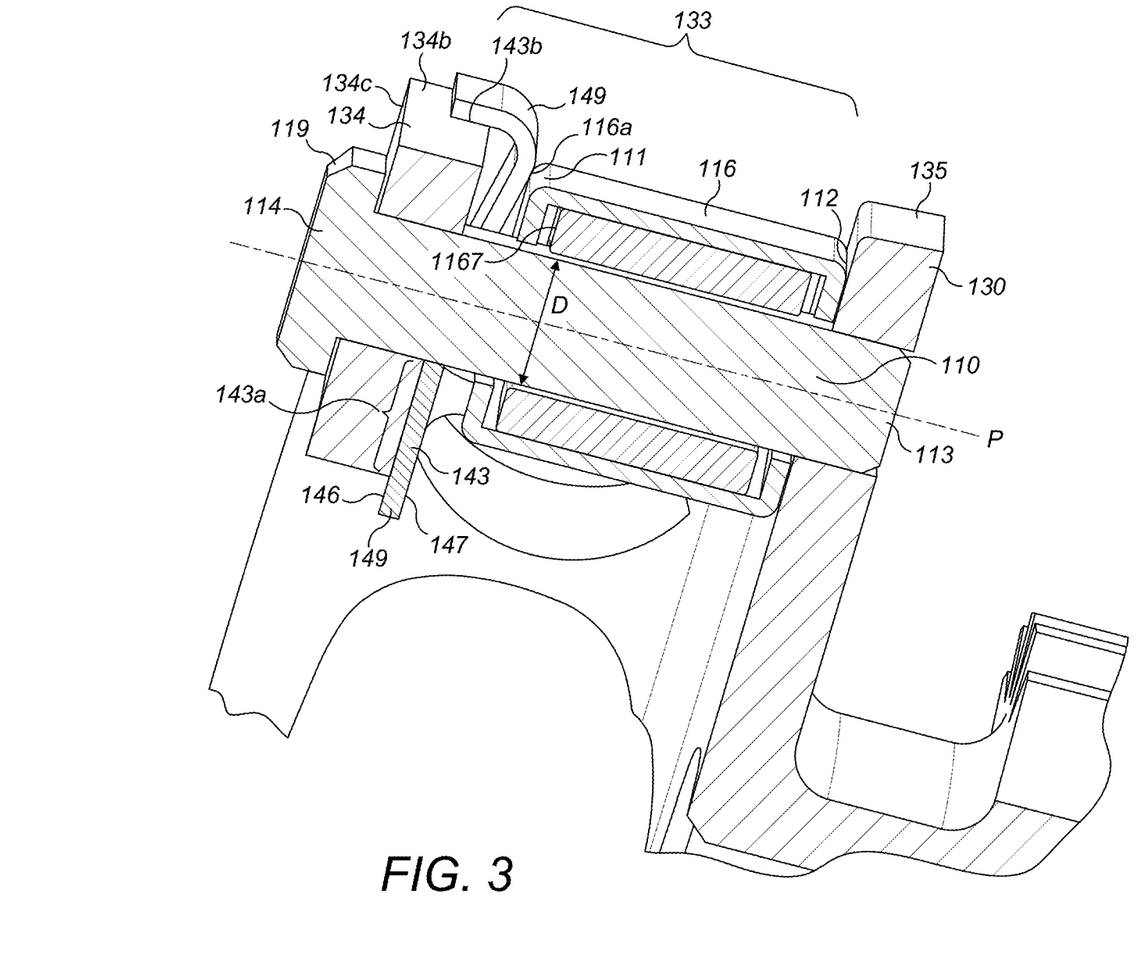
FIG. 3 depicts a cross-sectional view of the assembly of FIG. 2 taken along the central longitudinal axis of the pin.

In detail, and as shown in FIGS. 2, 3 and 5, it can be said that the pin 110 comprises a cylindrical shaft that extends longitudinally from a first end 113 to a second end 114 along its longitudinal axis, P. The second end 114 of the pin may have a stopper feature 119 that has a diameter that is larger than the diameter of the bores 180 in the carrier 130, so that once the pin 110 is inserted into both the opposing arms 134, 135 of the carrier, the pin 110 is prevented from moving any further once the second end 114 abuts the carrier 130, as shown. Of course, other features may alternatively be used, which would prevent further axial movement of the pin 110.

FIG. 3 depicts a cross-sectional view of the planetary gear holder section 133, showing the internal features of the assembly. As can be seen in this figure, around the outer circumference of the pin 110 a cylindrically shaped, and hollow bearing 116 is provided, that comprises a greater diameter than both axial ends 113, 114 of the pin 110.

The planetary gear holder sections 133 of the carrier 130 that are spaced apart around the outer circumference of the carrier 130 therefore comprise a first radially extending arm 134 and an axially opposing second radially extending arm 135. In use, the pin 110 may be positioned between these first 134 and second 135 arms, as shown in FIGS. 2, 3 and 5. The pin 110 is initially held in place within the carrier 130 via the axial ends 113, 114 of the pin being received in the opposing bores 180 formed in the first and second arms 134, 135 of each planetary gear holder section 133 of the carrier 130.

To achieve this, during assembly, the cylindrical, hollow bearing 116 is first positioned to extend longitudinally between the radially extending arms 134, 135 of the planetary gear holder section 133 and the first axial end 113 of the pin 110 is inserted through the bore of the first arm 134, through the hollow center 116*7* of the bearing 116 and finally through the center of the bore of the second arm 135, along the axis P (which extends perpendicular to the center axis of rotation C). The blocking feature 119 at the second end 114 of the pin 110 then prevents any further axial movement in this direction and so the pin 110 and bearing 116 are therefore initially held in place between the two arms 134, 135 of the carrier 130 in this way.

The hollow bearing 116 is therefore provided around and coaxially with said pin 110 and, as shown in FIGS. 2, 3 and 5, the bearing 116 is positioned so that it does not contact the first arm 134 of the carrier 130 but so that it does contact the second arm 135 of the carrier.

In greater detail, the bearing 116 therefore has a greater diameter than the pin 110 around which it is positioned and extends from a first end 111 to a second end 112. To lock this pin in place, in use, the second end 112 of the bearing is positioned so as to be in contact with and abut the inner surface of the second arm 135 of the carrier 130, whereas the first end 111 of the bearing does not abut or contact the inner surface of the first arm 134 of the carrier 130.

Instead, a bendable washer 140 is positioned between the first end 111 of the bearing 116 and the inner surface of the first arm 134 of the carrier 130, as shown in FIGS. 2, 3 and 5.

Figure 4:
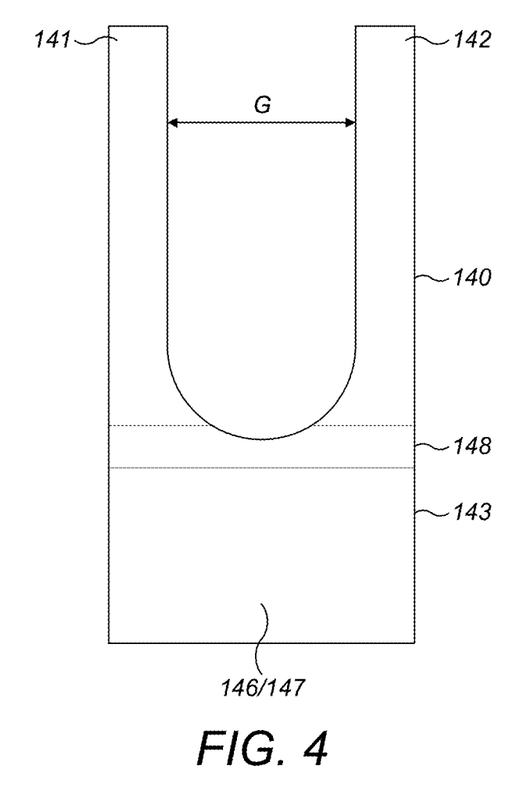
FIG. 4 depicts a front view of a washer that may be used with the assemblies of FIGS. 2 to 7.

The washer 140 is depicted in FIG. 4 and may be generally U, V or Y-shaped having two arms 141, 142 (i.e. the arms of the U, V, or Y-shape) extending away from a first section 143 of the washer 140 that makes the bottom section of the U, V, or Y-shape.

As can be seen in FIGS. 2, 3 and 5, the washer 140 may be positioned between the bearing 116 and the first arm 134 of the carrier so that the first section 143 (i.e. the bottom of the U, V or Y-shape) of the washer makes a first contact area 143*a* with the first arm 134 of the carrier 130. The washer 140 may be initially formed so that it is bent at a first angle X away from the surface that has the first contact area so as to extend towards and make a second contact area 116*b* with the bearing.

Figure 6:
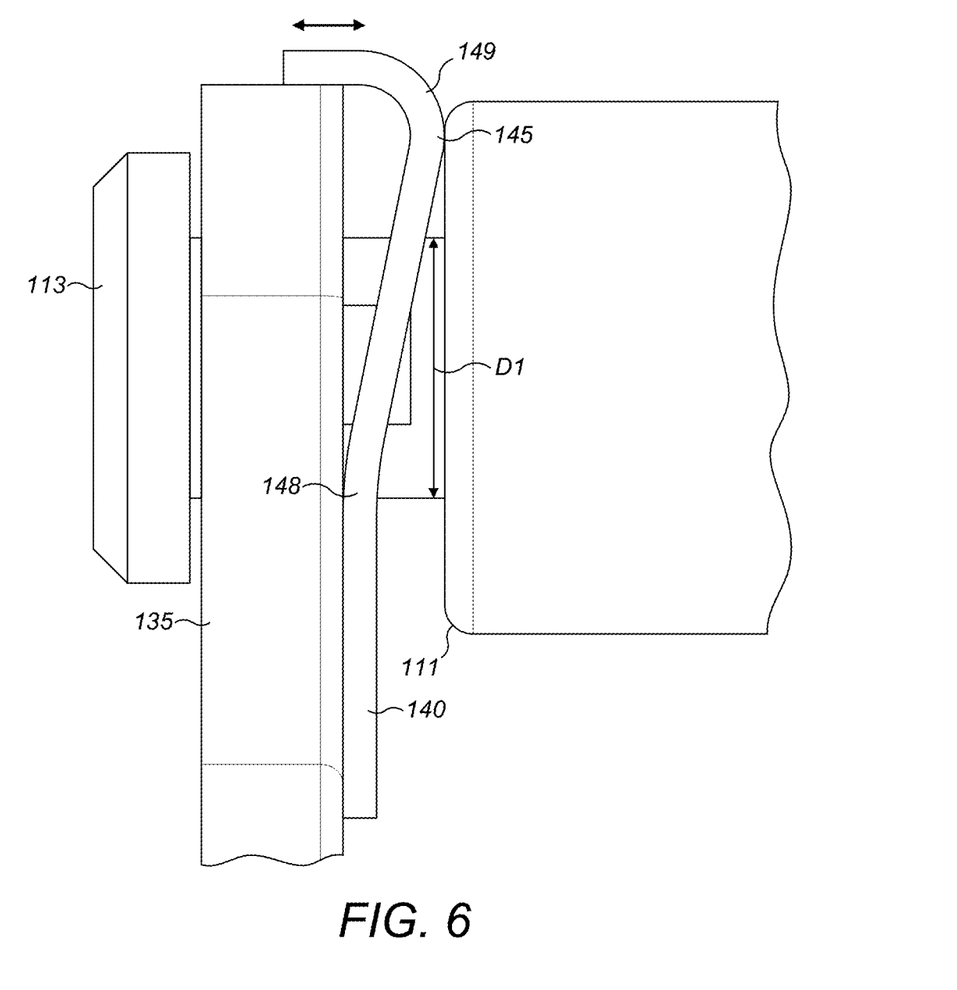
FIG. 6 depicts a side view of an improved pin and carrier locking assembly when the arms of the washer have been bent into their final locked position.

In other words, as can be seen in FIG. 5, initially the washer 140 may initially be manufactured so that, from a side view, the two arms 141, 142 of the U, V or Y-shape are bent in a direction away from the bottom section 143 of the washer 140 so that they extend in a plane that is at an angle x of approximately 15 to 30 degrees to the plane in which the bottom section 143 extends and contacts the internal surface of the first arm 134 of the carrier 130. This bend is at a first point 148 as shown in FIGS. 2, 4 and 6 (which in some examples may correspond to the point at which the arms begin to extend away from section 134).

Therefore, due to the washer bending in this way, whilst the bottom section 143 contacts only the inner surface of the first arm 134 of the carrier, 130, a section of each arm 141, 142 of the washer 140, contacts the first end 111 of the bearing 116 at the second contact point 116a, as shown in FIGS. 2, 3 and 5.

In use, the pin 110 is positioned as described above, internally of the two arms 141, 142 of the washer 140 so that the second end 112 of the bearing 116 contacts the inner surface of the second arm 135 of the carrier, and the U-shaped washer 140 is positioned between the first end 111 of the bearing 116 and the inner surface of the first arm 134 of the carrier 130, as shown in FIG. 5.

In some examples, once the washer 140 is held in place via these two contact areas 143a, 116a, the top section of the arms 141, 142 of the washer 140 can also then be bent at a second bend point 149 in a direction away from the first end 111 of the bearing 116 and the contact point 116a so that the arms 141, 142 then contact and rest against an outer circumferential surface, i.e. an external, or top portion of the first arm 134 of the carrier 130 as shown in FIGS. 2, 3 5 and 6.

The washer 140 will be described in greater detail. The U, V or Y-shaped washer 140 can be described has having a first U, V or Y-shaped face 146 and an opposing U, V, or Y-shaped face 147, with side walls 149 extending there between, as shown in the figures. In use, the first face 146 of the bottom section 143 of the U, V or Y-shaped washer 140 is in contact at point, or area 143a with the inner surface of the first arm 134 of the carrier 130, and due to the first bend at point 148, the arms 141, 142 therefore extend in the direction away from the first arm 134 of the carrier 130 and in the direction of the bearing 116, as described above.

The arms 141, 142 of the washer 140 therefore contact the first end 111 of the bearing 116 at the second contact point 116a via the second face 147 of the washer 140, as described above and as shown in FIGS. 2, 3 and 5. Once in place, the washer 140 may then be bent backwards so that the arms 141, 142 extend in a direction away from the bearing 116 and back in the direction of the first arm 134 of the carrier 130 so that the first face 146 of the arms of the washer 140 again contacts the first arm 134 of the carrier 130 at a third contact area 143b, at the carrier's top, or outermost circumferential surface 134b. In other words, the first face 146 of the washer 140 contacts the carrier 130 at two contact areas, 143a and at 143b, which are generally perpendicular to each other. Between these two contact areas, the washer 140 also contacts the bearing 116 at 116a. These three contact areas 134a, 116a, 134b allow the washer 140 to hold and lock the bearing in place on the pin 110 and relative to the carrier arms 134, 135.

Due to the shape of the washer, 140, it may work as a spring washer, to reduce vibrations in the pin 110. The washer 130 can be made from any material which may have a good condition for bending, such as any type of steel.

In order to further lock the pin 110 in place, opposing sides of the cylindrical outer surface of the pin 110 may be modified so that the outer surface of the pin at a certain, gripping section 110a may have a corresponding size and shape to a gripping section 140a provided on the inner surfaces of the arms 141, 142, of the washer 140.

In some examples, the width of the gap G between the arms 141, 142 of the washer 140 (see FIG. 4) may also be smaller than the overall outer diameter D1 of the pin 110 elsewhere, however, this gripping section 110a of the pin 110 may provide a section 110a of the pin 110 wherein the diameter D2 is reduced enough that the arms 141, 142 of the washer 140 may be positioned so as to contact and grip the gripping section 110a of the pin at diametrically opposed positions, as is shown in FIGS. 2 and 5.

In other words, although the pin 110 is generally cylindrical in shape, certain gripping sections of the pin 110a can be machined or altered to provide areas which help to improve grip. For example, in order to more securely lock the pin 110 in place relative to the washer 140, first and second gripping sections 110a provided on diametrically opposite sides of the pin 110 that in use face the inner surfaces of the arms 141, 142 of the washer 140 can be shaped and sized so as to reflect the shape and size of the inner surface of the arms with which they contact. In one example wherein the inner surfaces of the arms 141, 142 are flat, such as is shown in FIG. 5, the opposing sides 110a of the pin 110 that contact the inner surfaces of the arms 141, 142 can each have a section that is also flat so that the grip between the washer 140 and pin 110 is improved. To achieve this, in some examples, the outer cylindrical surface of the pin 110 two parallel cuts may be made on diametrically opposing sides of the pin.

Although U-shaped washers 140 are shown in FIGS. 2 to 7, other, similar shaped washers may also be used, providing they have arms 141, 142, to grip either side of the pin 110 and providing that the pin 110 has gripping sections 110a to contact and grip with these arms. For example, for a Y-shaped washer, the cuts in the pin may be made to reflect the angle at which the arms deflect away from each other (e.g. an angle that is perhaps 45 degrees), as opposed to the cuts in the being made parallel to each other (to reflect the fact that the arms 141, 142 extend parallel to each other).

The outer circumferential surface 134c of the carrier arm 134 where the third contact area 134b is made may also be modified to produce a gripping section at this third contact area 134b. For example, the section 134c of the side wall of the carrier 130 that contacts the top of the arms 141, 142 of the washer 140 can also be shaped and sized to reflect the shape and size of the first face 146 of the arms 141, 142 that will eventually be in contact with it at the third contact point 134b. In the examples shown in the FIGS. 2 to 6, this section 134c section is flat to reflect the fact that the face 146 of the washer 140 that contacts it is also flat, however, any corresponding shape could, in theory, be used.

In the examples described herein, wherein the locking assembly is used in a planetary gear mechanism, the planetary gears 12 are positioned on the pins 110, as is described with reference to FIGS. 1A and 1B, and individual U, V or Y-shaped washers are then used to individually lock into place the pins 110 relative the carrier 130.

Therefore, and in addition to the advantages described above, in these improved examples, the assembly does not comprise or require an intricately formed, circular washer that is positioned on an external side of the carrier. Instead, the improved locking mechanism shown in FIGS. 2 to 7 comprises a washer 140 (or plurality of washers 140, wherein more than one planetary gear is used) that is positioned internally of the two sides, or arms 134, 135 of the carrier 130, as is shown in FIGS. 2 to 6. In these examples, each pin 110 is also individually locked in place via a washer 140 (as opposed to one washer 13 locking all three pins in place such as in the prior art and as shown in FIGS. 1A and 1B).

The improved examples described herein therefore result in many advantages over known systems including: simplified solution and assembly, with no need to fit all three pins together with the same washer; a simple design that does not need a dedicated tool for manufacture; high cost reduction due to the fact that there is no longer the need to remove the material for the three small holders (less machining operations are also needed); less material is needed, as a smaller block is used to form the carrier, thereby also reducing the cost.

The invention claimed is:

1. An assembly for locking a pin and carrier in position relative to each other, comprising:
   said carrier having first and second opposing arms, each comprising a bore therein; and
   said pin having a longitudinal axis (P), wherein the axial ends of said pin are positioned within said opposing bores of the carrier; and
   a hollow bearing provided around and coaxially with said pin and between said first and second arms; said bearing being positioned so as to not contact the first arm of the carrier but to contact the second arm of the carrier; and
   the assembly further comprising:
   a washer positioned between said bearing and the first arm of the carrier; and wherein said washer is positioned so that a first section of the washer makes a first contact area with the first arm of the carrier, and wherein the washer is bent at a first angle (X) away from said first contact area so as to extend towards and make a second contact area with the bearing.

2. The assembly of claim 1, wherein said washer is bent at a second angle (Y) away from said second contact area so as to extend back towards and make a third contact area with the first arm of the carrier.

3. The assembly of claim 1, wherein at said first contact area the washer extends in a direction that is perpendicular to the axis (P) of the pin.

4. The assembly of claim 3, wherein at said third contact area said washer extends in a direction that is perpendicular to the direction in which the washer extends at the first contact area.

5. The assembly of claim 4, wherein said third contact area is on an external peripheral portion of the first arm of the carrier and extends in the axial direction.

6. The assembly of claim 1, wherein said washer is U, V, or Y shaped.

7. The assembly of claim 6 wherein a lower section of the washer that forms the bottom part of the U, V, or Y-shape contacts, at said first contact area an inner surface of the first arm of the carrier.

8. The assembly of claim 1, wherein said pin comprises a cylindrical shaft extending along said axis (P) with a first cylindrical outer diameter (D); and said pin further comprising first and second gripping sections provided at diametrically opposite sides of said pin, said pin having a second diameter (D2) between said gripping sections, said second diameter (D2) being smaller than said first diameter (D1); and wherein a width W between first and second arms of said washer is smaller than said first diameter (D1), but corresponds to said second diameter D2 to allow the inner surface of the arms to contact the gripping sections of said pin.

9. A planetary gear mechanism comprising the pin and carrier locking assembly of claim 1, the gear mechanism further comprising a sun gear, a ring gear, positioned coaxial to the sun gear and a plurality of planetary gears positioned around said pins and further positioned externally to the sun gear but internally to the ring gear so that the outer surface of the planetary gears engage with both the external surface of the sun gear and the internal surface of the ring gear.

10. A method for locking a pin and carrier in position relative to each other, comprising:
    providing a carrier having first and second opposing arms, each comprising a bore therein; and
    providing a hollow cylindrical bearing between said arms, of the carrier;
    axially inserting a first end of said pin into the bore provided in the first arm of the carrier, through said hollow center of the bearing and into the bore of the second arm so that said bearing is positioned so as to not contact the first arm of the carrier but to contact the second arm of the carrier; and
    positioning a washer between said bearing and the first arm of the carrier so that a first section of the washer makes a first contact area with the first arm of the carrier, and wherein said washer is bent at a first angle (X) away from said first contact area so as to extend towards and make a second contact area with the bearing.

11. The method of claim 10, further comprising bending said washer at a second angle (Y) away from said second contact area so that said washer extends back towards and make a third contact area with the first arm of the carrier.

12. The method of claim 10, comprising positioning said washer so that the washer extends in a direction that is perpendicular to the axis (P) of the pin.

13. The method of claim 10, further comprising positioning said washer so that, at said third contact area, said washer extends in a direction that is perpendicular to the direction in which the washer extends at the first contact area.

14. The method of claim 10, wherein said washer is U, V, or Y shaped.

15. The method of claim 14, wherein said pin comprises a cylindrical shaft extending along said axis (P) with a first cylindrical outer diameter (D); and said method further comprises providing first and second gripping sections at diametrically opposite sides of said pin so that said pin has a second diameter (D2) between said gripping sections that is smaller than said first diameter (D1); and
    positioning said washer relative to said pin so that first and second arms of said washer are in contact with said first and second gripping sections, a width G between said first and second arms of said washer being smaller than said first diameter (D1), but corresponding to said second diameter D2 to allow the inner surface of the arms to contact and grip the gripping sections of said pin.

* * * * *